(12) United States Patent
Zhang et al.

(10) Patent No.: US 10,313,067 B2
(45) Date of Patent: Jun. 4, 2019

(54) HARQ-ACK INFORMATION FEEDBACK METHOD AND APPARATUS

(71) Applicant: Samsung Electronics Co., Ltd., Suwon-si, Gyeonggi-do (KR)

(72) Inventors: Shichang Zhang, Beijing (CN); Yingyang Li, Beijing (CN); Jingxing Fu, Beijing (CN); Yi Wang, Beijing (CN); Chengjun Sun, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 15/010,359

(22) Filed: Jan. 29, 2016

(65) Prior Publication Data

US 2016/0226630 A1 Aug. 4, 2016

(30) Foreign Application Priority Data

Jan. 29, 2015 (CN) .......................... 2015 1 0047578
Apr. 10, 2015 (CN) .......................... 2015 1 0170269

(51) Int. Cl.
*H04L 1/18* (2006.01)
(52) U.S. Cl.
CPC .......... *H04L 1/1861* (2013.01); *H04L 1/1893* (2013.01); *H04L 1/1896* (2013.01)
(58) Field of Classification Search
CPC combination set(s) only.
See application file for complete search history.

(56) References Cited

U.S. PATENT DOCUMENTS

| 9,106,419 B2* | 8/2015 | Chen ..................... H04L 1/1861 |
| 9,131,491 B2* | 9/2015 | Lee ..................... H04W 72/042 |
| 9,439,095 B2* | 9/2016 | He ..................... H04W 52/0258 |
| 2011/0128922 A1* | 6/2011 | Chen ..................... H04L 5/0007 370/329 |

(Continued)

FOREIGN PATENT DOCUMENTS

EP 2 451 111 A2 5/2012

OTHER PUBLICATIONS

European Search Report dated Jan. 2, 2018, issued in the European patent application No. 16743721.9.

*Primary Examiner* — Kibrom T Hailu
(74) *Attorney, Agent, or Firm* — Jefferson IP Law, LLP

(57) ABSTRACT

An apparatus and method for feeding back hybrid automatic repeat request-acknowledgement (HARQ-ACK) information are provided. The apparatus and method include user equipment (UE) that first receives a downlink grant (DL-GRANT) which schedules downlink HARQ transmission in a time-frequency bundling window corresponding to an uplink subframe used for feeding back HARQ-ACK, obtains a DL downlink assignment index (DL DAI) in the DL-GRANT, and determines a mapping value of each DL DAI. Then, according to the mapping value of the corresponding DL DAI, the HARQ-ACK bit of each HARQ feedback unit is mapped to a corresponding bit of a feedback bit sequence. According to the method and apparatus provided by the present disclosure, useless HARQ-ACK bits may be effectively removed, and efficiency for feeding back HARQ-ACK may be increased. As such, a downlink peak rate of a UE is ensured.

8 Claims, 5 Drawing Sheets

(56) References Cited

U.S. PATENT DOCUMENTS

| | | | |
|---|---|---|---|
| 2011/0141878 A1* | 6/2011 | Che | H04L 1/0025 370/216 |
| 2012/0039280 A1 | 2/2012 | Chen et al. | |
| 2012/0099491 A1 | 4/2012 | Lee et al. | |
| 2012/0106408 A1 | 5/2012 | Papasakellariou et al. | |
| 2012/0327885 A1* | 12/2012 | Chung | H04L 1/1614 370/329 |
| 2013/0114474 A1 | 5/2013 | Fu et al. | |
| 2013/0114575 A1 | 5/2013 | Fu et al. | |
| 2013/0230033 A1* | 9/2013 | Lee | H04W 72/042 370/336 |
| 2014/0016522 A1 | 1/2014 | Ahn et al. | |
| 2014/0092824 A1* | 4/2014 | He | H04W 52/0258 370/329 |
| 2014/0105076 A1 | 4/2014 | Yang et al. | |
| 2015/0131494 A1* | 5/2015 | He | H04B 7/0469 370/280 |
| 2015/0189658 A1* | 7/2015 | Zhang | H04B 7/0482 370/280 |
| 2016/0241377 A1* | 8/2016 | Takeda | H04W 72/04 |
| 2016/0337110 A1* | 11/2016 | Yang | H04L 1/1854 |
| 2017/0170931 A1* | 6/2017 | Kusashima | H04L 1/1861 |

* cited by examiner

HARQ-ACK INFORMATION FEEDBACK METHOD AND APPARATUS

CROSS-REFERENCE TO RELATED APPLICATION(S)

This application claims the benefit under 35 U.S.C. § 119(a) of a Chinese patent application filed on Jan. 29, 2015 in the State Intellectual Property Office and assigned Serial number 201510047578.7, and of a Chinese patent application filed on Apr. 10, 2015 in the State Intellectual Property Office and assigned Serial number 201510170269.9, the entire disclosure of each of which is hereby incorporated by reference.

TECHNICAL FIELD

The present disclosure relates to radio communication techniques. More particularly, the present disclosure relates to a hybrid automatic repeat request-acknowledgement (HARQ-ACK) information feedback method and apparatus.

BACKGROUND

Long-term evolution (LTE) system supports two duplex modes including frequency division duplex (FDD) and time division duplex (TDD).

FIG. 1 shows a frame structure of a TDD system according to the related art.

Referring to FIG. 1, each radio frame is of 10 ms length and is divided into two 5 ms half-frames. Each half-frame includes eight 0.5 ms slots and three special fields, i.e., downlink pilot slot (DwPTS), guard period (GP) and uplink pilot slot (UpPTS). The total length of the three special fields is 1 ms. The TDD system supports 7 kinds of uplink-downlink configurations, as shown in Table 1. Herein, D denotes a downlink subframe, U denotes an uplink subframe, and S denotes a special subframe including the above three special fields.

TABLE 1

Uplink-downlink configurations of LTE TDD

| Configuration index | Switching point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In the LTE-advanced (LTE-A) system, a wider working bandwidth is obtained through combining multiple component carriers (CCs) via a carrier aggregation (CA) technique, and therefore data transmission rate may be further increased. Each CC corresponds to one cell. According to current UE standards (e.g., Rel-12), a UE may work on at most 5 CCs at the same time, wherein one of the 5 CCs is a primary cell (Pcell), and other CCs are secondary cells (Scells).

In downlink communication of the LTE-A system, a hybrid automatic repeat request (HARQ) technique is utilized to ensure reliability of downlink data receipt. The user equipment (UE) receives a downlink grant (DL-GRANT), wherein the DL-GRANT is carried by a physical downlink control channel (PDCCH) or an enhanced PDCCH (EPDCCH). For each transmission block (TB) received via physical downlink shared channel (PDSCH), or received PDCCH indicating release of semi-persistent scheduling (hereinafter the above two are referred to as downlink HARQ transmission), the UE needs to feed back an acknowledgement (ACK) (correct receipt) bit or negative ACK (NACK) (incorrect receipt or lost) bit to the base station via corresponding uplink subframe, hereinafter referred to as a HARQ-ACK bit. If the eNB receives the NACK bit, the eNB re-transmits the TB corresponding to the NACK or the PDCCH indicating the release of the SPS. According to different HARQ-ACK mechanisms, the LTE-A standard defines corresponding methods for determining the number of HARQ-ACK bits to be fed back and values of the HARQ-ACK bits.

In an FDD system, if the UE feeds back a HARQ-ACK bit in an uplink subframe n via a physical uplink shared channel (PUSCH), the number of HARQ-ACK bits to be fed back is determined according to the number of carriers configured for the UE and a transmission mode (e.g., transmission mode of one TB or transmission mode of two TBs) of each carrier. For each carrier configured for the UE, if the transmission mode is one TB, the carrier corresponds to one HARQ-ACK bit. If the transmission mode is two TBs, the carrier corresponds to two HARQ-ACK bits. The bits are arranged according to an ascending order of the indexes of the carriers, to form a HARQ-ACK bit sequence that the UE finally feeds back in an uplink subframe n. The HARQ-ACK bit sequence refers to that before channel coding, and the same applies hereinafter.

In the TDD system, the number of HARQ-ACK bits to be fed back by the UE in an uplink (UL) subframe n is determined by a HARQ-ACK time-frequency bundling window, a UL downlink assignment index (UL DAI) carried in a UL grant (UG) of subframe n, a number of carriers configured for the UE, and the transmission mode configured for each carrier, in which the HARQ-ACK time-frequency bundling window is determined by a TDD uplink-downlink configuration corresponding to a HARQ-ACK timing relationship followed by the HARQ-ACK feed back of the UE, denoting all downlink subframes on one carrier whose HARQ-ACK is to be fed back in a subframe n. The indexes of the downlink subframes are denoted by $n-k_i$, $k_i \in K$, wherein the dimension M of the set K is referred to as the size of the time-frequency bundling window. The set K determined by the present LTE standard with respect to the HARQ timing relationships corresponding to different TDD uplink-downlink configurations is as shown in Table 2. For facilitating the description, the subframe set K corresponding to the time-frequency bundling window determined by the HARQ timing relationship of FDD is defined as {4}, M=1 at this time.

In the following, UL DAI denotes a maximum number of downlink subframes that actually have downlink HARQ transmission in the time-frequency bundling window configured for each carrier of the UE. For each carrier configured for the UE, the number of downlink subframes that need to feed back HARQ-ACK in a subframe n is Bc=min (Mc, UL DAI), wherein min denotes an operation of obtaining a minimum value, and Mc denotes the size of the time-frequency bundling window corresponding to the carrier c. If the transmission mode of the current carrier is one TB, the number of HARQ-ACK bits corresponding to this carrier is Oc=Bc, and each subframe corresponds to one HARQ-ACK bit. If the transmission mode of the current carrier is two TBs, the number of HARQ-ACK bits corresponding to the carrier is Oc=2×Bc, and each downlink subframe corresponds to two HARQ-ACK bits.

TABLE 2

Set K: $\{k_0, k_1, \ldots k_{M-1}\}$ determined by different HARQ timing relationships

| TDD uplink-downlink configuration | Subframe index | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the TDD system, the HARQ-ACK bit sequence that needs to be fed back by the UE is determined by a sum $O_{UE}$ of HARQ-ACK bits corresponding to all carriers. If $O_{UE}$ is not larger than 20, the HARQ-ACK bit of each carrier is arranged according to an ascending order of the carrier indexes to form the HARQ-ACK bit sequence to be fed back by the UE. Otherwise, if $O_{UE}$ is larger than 20, for all carriers whose transmission mode is two TBs, an "OR" calculation (i.e., spatial bundling) is performed on the two HARQ-ACK bits corresponding to two TBs of each subframe, to obtain one HARQ-ACK bit. For the carriers whose transmission mode is one TB, the HARQ-ACK bit corresponding to each subframe is unchanged. After the above processing, the HARQ-ACK bit of each carrier of the UE is arranged according to the ascending order of the carrier indexes to generate the HARQ-ACK bit sequence to be fed back by the UE.

It can be seen from the above description that, in the HARQ-ACK feedback mechanism defined by existing standards, the HARQ-ACK bit sequence finally fed back by the UE may include a HARQ-ACK bit corresponding to a downlink subframe which has no downlink HARQ transmission. For example, in the FDD system, whether or not there is downlink HARQ-ACK, transmission on the carrier, the HARQ-ACK bit sequence fed back by the UE always includes a HARQ-ACK bit corresponding to that carrier. In the TDD system, however, the UE determines the number of downlink subframes having downlink HARQ transmission on each carrier, but the value of Bc may be larger than the number of downlink subframes actually having downlink HARQ transmission in the time-frequency bundling window corresponding to the carrier. According to the current standards, the UE supports at most 5 carriers. Therefore, the existence of the nonsense HARQ-ACK bit does not have much impact to the system performance.

However, in order to further increase the downlink peak rate of the UE, it is well recognized by third generation partnership project (3GPP) member companies that the maximum number of carriers supported by the UE should be increased. According to the conclusion of the 3GPP radio access network (RAN) #66 meeting, the number of carriers supported by the UE will be increased to 32, wherein carriers on the unlicensed band may be included. With the increase of the number of downlink carriers supported by the UE, the absolute value of non-scheduled downlink subframes may increase accordingly. Therefore, if the current HARQ-ACK feedback mechanism is still utilized, the efficiency for feeding back information will decrease and finally affect the downlink peak rate of the UE, which contradicts the initial objective of increasing the number of carriers.

It can be seen from the above that, in order to effectively support downlink CA with at most 32 carriers, the existing HARQ-ACK feedback mechanism affects the downlink peak rate of the UE due to its low feedback efficiency. There is no appropriate solution at present.

The above information is presented background information only, to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a hybrid automatic repeat request-acknowledgement (HARQ-ACK) information feedback method and apparatus.

In accordance with an aspect of the present disclosure, a HARQ-ACK information feedback method, applicable for a downlink carrier aggregation (CA) system, is provided. The HARQ-ACK information feedback method includes, in a time-frequency bundling window corresponding to an uplink subframe in which HARQ-ACK is fed back, receiving a downlink grant (DL-GRANT) scheduling downlink HARQ transmission, obtaining a downlink (DL) downlink assignment index (DL DAI) in a DL-GRANT, and determining a mapping value of each DL DAI, and mapping a HARQ-ACK bit of each HARQ feedback unit to a corresponding bit of a feedback bit sequence according to the mapping value of the corresponding DL DAI.

In an embodiment of the present disclosure, the time-frequency bundling window comprises all downlink subframes whose HARQ-ACK is fed back in the uplink subframe, and all of the downlink subframes are arranged according to a predefined rule.

In an embodiment of the present disclosure, the DL DAI in the DL-GRANT is one of two types, wherein type 1 is a time-domain DL DAI, and type 2 is a combined DAI. The mapping value of the DL DAI of type 1 indicates the number of downlink subframes scheduled by the DL-GRANT containing the DL DAI of type 1 from the first downlink subframe in the time-frequency bundling window to the downlink subframe where the DL-GRANT corresponding to the DL DAI is located. The mapping value of the DL DAI of type 2 indicates the number of HARQ feedback units scheduled by the DL-GRANT containing DL DAI of type 2 from the first downlink subframe in the time-frequency bundling window to the downlink subframe wherein the DL-GRANT corresponding to the DL DAI is located.

In an embodiment of the present disclosure, if the length of the DL DAI is 3 bits, a mapping relationship between the DL DAI and the mapping value of the DL DAI is as shown in Table 3.

TABLE 3

| DL DAI | Mapping value of DL DAI |
|---|---|
| 0, 0, 0 | 1 or 9 or 17 or . . . |
| 0, 0, 1 | 2 or 10 or 18 or . . . |
| 0, 1, 0 | 3 or 11 or 19 or . . . |
| 0, 1, 1 | 4 or 12 or 20 or . . . |
| 1, 0, 0 | 5 or 13 or 21 or . . . |
| 1, 0, 1 | 6 or 14 or 22 or . . . |
| 1, 1, 0 | 7 or 15 or 23 or . . . |
| 1, 1, 1 | 0 or 8 or 16 or . . . |

In an embodiment of the present disclosure, an index $m_{k_c}$ of each downlink subframe in the time-frequency bundling window is determined by Equation (1) below:

let $m_{k_c}=0$ let $i=k_{max}$ let $j=0$ while $i \geq k_c$ while $j < Nc$      Equation (1)

if subframe with index n-i on carrier j is a downlink subframe, and the HARQ-ACK bit of this subframe is fed back in uplink subframe n $m_{k_c}=m_{k_c}+1$ else $m_{k_c}=m_{k_c}$
end if
j=j+1;
end while
i=i-1;
end while wherein c denotes an index of the carrier where the downlink subframe is located in the time-frequency bundling window, and $0 \leq c < Nc$. Nc denotes a total number of downlink component carriers (CCs) whose HARQ-ACK is fed back in the uplink subframe. The index of the downlink subframe in the time-frequency bundling window is $n-k_c$, wherein n denotes an index of the uplink subframe, and $k_c \in Kc$. K is determined according to a HARQ timing relationship adopted by the UE when feeding back HARQ-ACK of downlink subframes on carrier c in the uplink subframe n, and $k_{max}$ denotes a maximum value in set K, set K being a union of sets K0, K1, . . . $K_{Nc}$.

In an embodiment of the present disclosure, the HARQ feedback unit is an entity corresponding to each HARQ-ACK bit.

In an embodiment of the present disclosure, the HARQ feedback unit is a transmission block (TB) or a downlink subframe.

In an embodiment of the present disclosure, the mapping of the HARQ-ACK bit of each HARQ feedback unit to the corresponding bit of the feedback bit sequence according to the corresponding mapping value of the DL DAI includes, if the HARQ feedback unit is TBs, and if the downlink HARQ transmission mode in downlink subframe $m_{k_c}$ is one TB, the HARQ-ACK bit of the TB corresponds to $$O_{DAI_{k_c}+\Delta}$$

in the feedback bit sequence $o_0\ o_1, \ldots, o_{O_{ACK}-1}$. If the transmission mode of the downlink HARQ transmission in subframe $m_{k_c}$ is two TBs, the HARQ-ACK bit of a first TB corresponds to $$O_{DAI_{k_c}-1+\Delta}$$

in the feedback bit sequence $o_0\ o_1, \ldots, o_{O_{ACK}-1}$, and the HARQ-ACK bit of a second TB corresponds to $O_{DAI_{k_c}+\Delta}$ in the feedback bit sequence $o_0\ o_1, \ldots, o_{O_{ACK}-1}$. If the feedback unit is downlink subframes, the HARQ-ACK bit of downlink subframe $m_{k_c}$ which has downlink HARQ transmission within the time-frequency bundling window corresponds to $$O_{DAI_{k_c}+\Delta}$$

in the feedback bit sequence $o_0\ o_1, \ldots, o_{O_{ACK}-1}$. In each case, c denotes an index of the carrier where the downlink subframe is located in the time-frequency bundling window, and $0 \leq c < Nc$. Nc denotes a total number of downlink CCs whose HARQ-ACK is fed back in the uplink subframe. The index of the downlink subframe in the time-frequency bundling window is $n-k_c$, wherein n denotes an index of the uplink subframe, $k_c \in Kc$. K is determined according to a HARQ timing relationship adopted by the UE when feeding back HARQ-ACK of downlink subframes on carrier c in the uplink subframe n. $O_{ACK}$ denotes a total length of the feedback bit sequence, $DAI_{k_c}$ denotes the mapping value of DL DAI of downlink subframe n-k on carrier c, and the value of $\Delta$ is determined by a position of the HARQ-ACK bit of a downlink subframe which is on a carrier not supporting the DL-GRANT containing the DL DAI and whose HARQ-ACK is fed back in the uplink subframe in the feedback bit sequence and number of the HARQ-ACK bit.

In an embodiment of the present disclosure, the HARQ-ACK bit of the TB of the downlink subframe or the HARQ-ACK bit of the downlink subframe which is scheduled by the DL-GRANT containing the DL DAI of type 1 and whose HARQ-ACK is fed back in the uplink subframe n is mapped to a predefined position in the feedback bit sequence.

In an embodiment of the present disclosure, the mapping to the predefined position in the feedback bit sequence comprises mapping to a start point of the feedback bit sequence, mapping to a position behind a HARQ-ACK bit corresponding to semi-persistent scheduling (SPS) transmission, mapping to the end of the HARQ-ACK bit sequence corresponding to the HARQ feedback unit in the time-frequency bundling window, or mapping to a position in front of a HARQ-ACK bit corresponding to the SPS transmission.

In an embodiment of the present disclosure, the method further includes, if there is SPS downlink transmission in the time-frequency bundling window, mapping the HARQ-ACK bit corresponding to the SPS transmission to a predefined position in the feedback bit sequence according to an index of the downlink subframe where the SPS transmission is located in the time-frequency bundling window.

In an embodiment of the present disclosure, the mapping to the predefined position of the feedback bit sequence includes, according to an index of the downlink subframe where the SPS transmission is located in the time-frequency bundling window, mapping the HARQ-ACK bit corresponding to the SPS transmission to a start point of the feedback bit sequence according to an ascending order of indexes or mapping the HARQ-ACK bit of the SPS transmission to a position in front of the HARQ-ACK bit corresponding to downlink HARQ transmission scheduled by the DL-GRANT containing DL DAI of type 1, or according to the index of the downlink subframe where the SPS transmission is located in the time-frequency bundling window, mapping the HARQ-ACK bit corresponding to the SPS transmission to the end of the feedback bit sequence according to a descending order of indexes or mapping the HARQ-ACK bit corresponding to the SPS transmission to a position in front of the HARQ-ACK bit corresponding to the downlink HARQ transmission scheduled by the DL-GRANT containing DL DAI of type 1. If there is a HARQ-ACK bit corresponding to downlink HARQ transmission of another type in front of the HARQ-ACK bit corresponding to the downlink HARQ transmission scheduled by the DL-GRANT containing DL DAI of type 2, the value of $\Delta$ equals the total number of HARQ-ACK bits corresponding to the downlink HARQ transmission of the another type. Otherwise, the value of $\Delta$ is 0.

In an embodiment of the present disclosure, the method further includes in the feedback bit sequence, if a bit does not correspond to any HARQ feedback unit, configuring the bit as a negative ACK (NACK).

In an embodiment of the present disclosure, the value of $O_{ACK}$ is dynamically indicated by an enhanced node B (eNB) via higher physical layer signaling or indicated semi-statically or statically by the eNB via higher layer signaling, or determined by the UE according to actually received HARQ feedback unit in the time-frequency bundling window, wherein the UE determines a format of a feedback channel according to the number of HARQ feedback units actually received by the UE in the time-frequency bundling window and other information that needs to be fed back, and obtains the $O_{ACK}$ by subtracting the number of bits occupied by the other information to be fed back from a capacity of the feedback channel.

In an embodiment of the present disclosure, the dynamic indicating via physical layer signaling includes indicating via UL DAI, or indicating by adding an additional bit in the DL-GRANT or using a redundant bit in the DL-GRANT, wherein in the DL-GRANT transmitted in each subframe, the bit indicates the total number of HARQ-ACK feedback units scheduled on the carrier adopting the DL-GRANT containing the DL DAI of the same type in the subframe.

In accordance with another aspect of the present disclosure, an apparatus for feeding back HARQ-ACK information is provided. The apparatus includes a receiving module adapted to receive, in a time-frequency bundling window corresponding to an uplink subframe used for feeding back HARQ-ACK information, DL-GRANT scheduling downlink HARQ transmission, obtain a DL DAI in the DL-GRANT, and determine a mapping value of each DL DAI. The apparatus further includes a feedback module adapted to map a HARQ-ACK bit of each HARQ feedback unit to a corresponding bit in a feedback bit sequence according to a mapping value of the corresponding DL DAI.

In a HARQ-ACK information feedback method and apparatus according to aspects of the present disclosure, the UE first determines the HARQ feedback unit, and then determines a time-frequency bundling window corresponding to an uplink subframe used for feeding back HARQ-ACK, receives DL-GRANT scheduling downlink HARQ transmission in the time-frequency bundling window, obtains DL DAI from the DL-GRANT, and maps the DL DAI to a certain integer according to a predefined mapping rule. According to this integer, the UE is able to determine the number of feedback units having been scheduled from the first downlink subframe in the time-frequency bundling window to the current downlink subframe. The UE further determines the total number of HARQ-ACK bits to be fed back in the time-frequency bundling window through receiving physical layer signaling or higher layer signaling from the eNB, and maps the HARQ-ACK bit of each feedback unit to a corresponding bit in the feedback bit sequence according to the mapping value of the corresponding DL DAI. According to aspects of the present disclosure, invalid HARQ-ACK bits may be effectively removed, the efficiency for feeding back the HARQ-ACK may be increased and thus, a downlink peak rate of a UE is ensured.

Other aspects, advantages, and salient features of the disclosure will become apparent to those skilled in the art from the following detailed description, which, when taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

According to the hybrid automatic repeat request-acknowledgement (HARQ-ACK) feedback mechanism defined by current long term evolution (LTE) standards, the HARQ-ACK bit sequence finally fed back by the user equipment (LTE) includes HARQ-ACK bits of downlink subframes which do not contain downlink HARQ transmission. Thus, the feedback mechanism has a relatively low efficiency. If this mechanism is still utilized in the downlink carrier aggregation (CA) supporting at most 32 carriers, the downlink peak rate of the UE will be affected. In order to solve this problem, the present disclosure provides a HARQ-ACK information feedback method.

Figure 1:
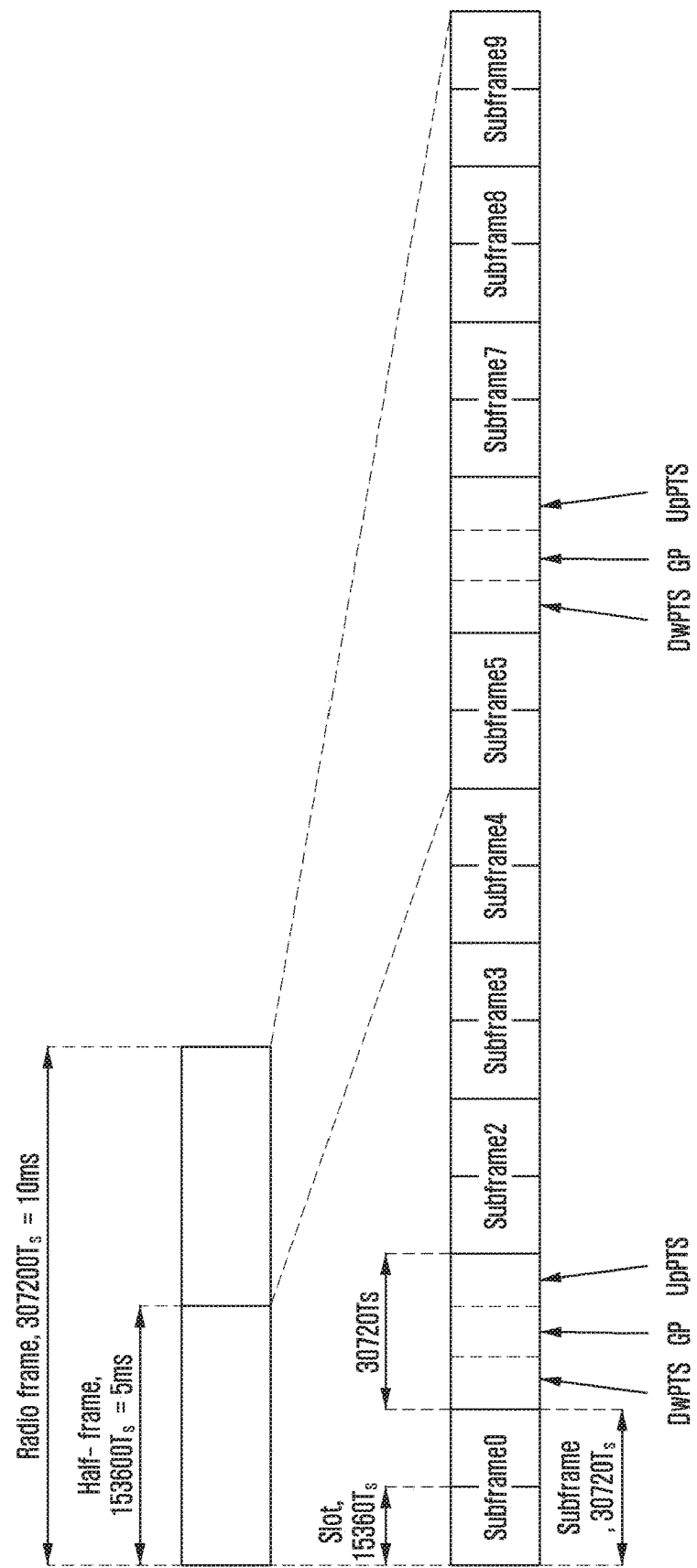
FIG. 1 is a schematic diagram illustrating a time division duplex (TDD) system frame structure according to the related art.
Figure 2:
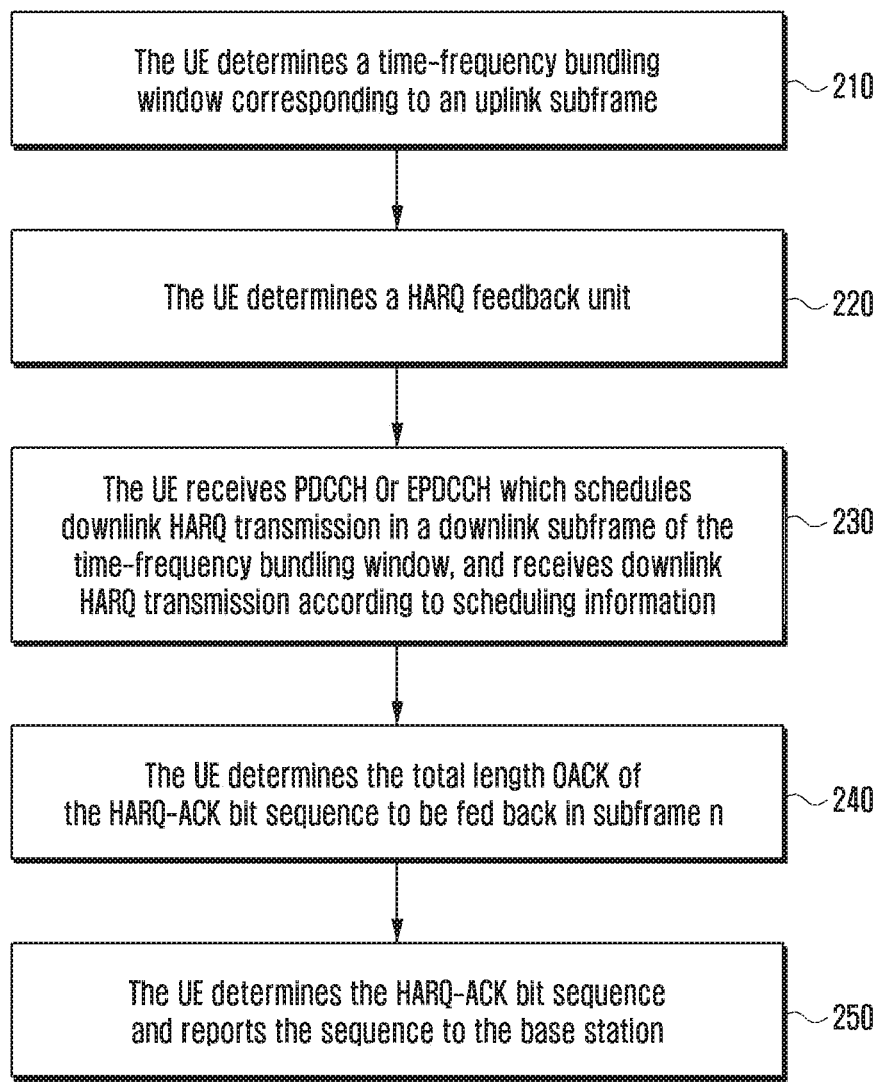
FIG. 2 is a flowchart illustrating a hybrid automatic repeat request-acknowledgement (HARQ-ACK) information feedback method according to an embodiment of the present disclosure.

FIG. 2 is a flowchart illustrating a HARQ-ACK information feedback method according to an embodiment of the present disclosure.

Referring to FIG. 2, at operation 210, the UE determines a time-frequency bundling window corresponding to an uplink subframe n.

The time-frequency bundling window is a set formed by all downlink subframes on the carrier whose HARQ-ACK is fed back in uplink subframe n. The index c of the carrier that any downlink subframe is located in the time-frequency window satisfies $0 \leq c < Nc$, wherein the carrier index starts from 0. The subframe index is denoted by $n-k_c$, wherein $k_c \in Kc$. Kc is determined by the HARQ timing relationship adopted by the HARQ-ACK of downlink subframe fed back in uplink subframe n, i.e., if the HARQ timing relationship is frequency division duplex (FDD), Kc is $\{4\}$. If the HARQ timing relationship is a certain configuration of the time division duplex (TDD), Kc is a set corresponding to a TDD configuration as shown in Table 2. Nc denotes the total number of downlink component carriers (CCs) feeding back HARQ-ACK in uplink subframe n. All downlink subframes in the time-frequency bundling window are sorted according to a predefined rule. The UE and the enhanced node B (eNB) have the same knowledge about the sorting. In an embodiment of the present disclosure, for any downlink subframe in the time-frequency bundling window, the sorting is performed firstly according to frequency and then according to time, in particular, the index $m_{k_c}$ of each downlink subframe in the time-frequency bundling window may be determined according to the following Equation (2).

Let $k_{max}$ denote a maximum value in set K,
wherein set K is a union of sets K0, K1 ... $K_{Nc}$;

$$\text{let } m_{k_c}=0$$

$$\text{let } i=k_{max}$$

$$\text{let } j=0$$

$$\text{while } j \geq k_c$$

$$\text{while } j<Nc \qquad \text{Equation (2)}$$

if subframe with index n-i on carrier j is a downlink subframe, and the HARQ-ACK bit of this subframe is fed back in uplink subframe n $$m_{k_c}=m_{k_c}+1$$

else $$m_{k_c}=m_{k_c}$$

end if
j=j+1;
end while
i=i−1;
end while

Figure 3:
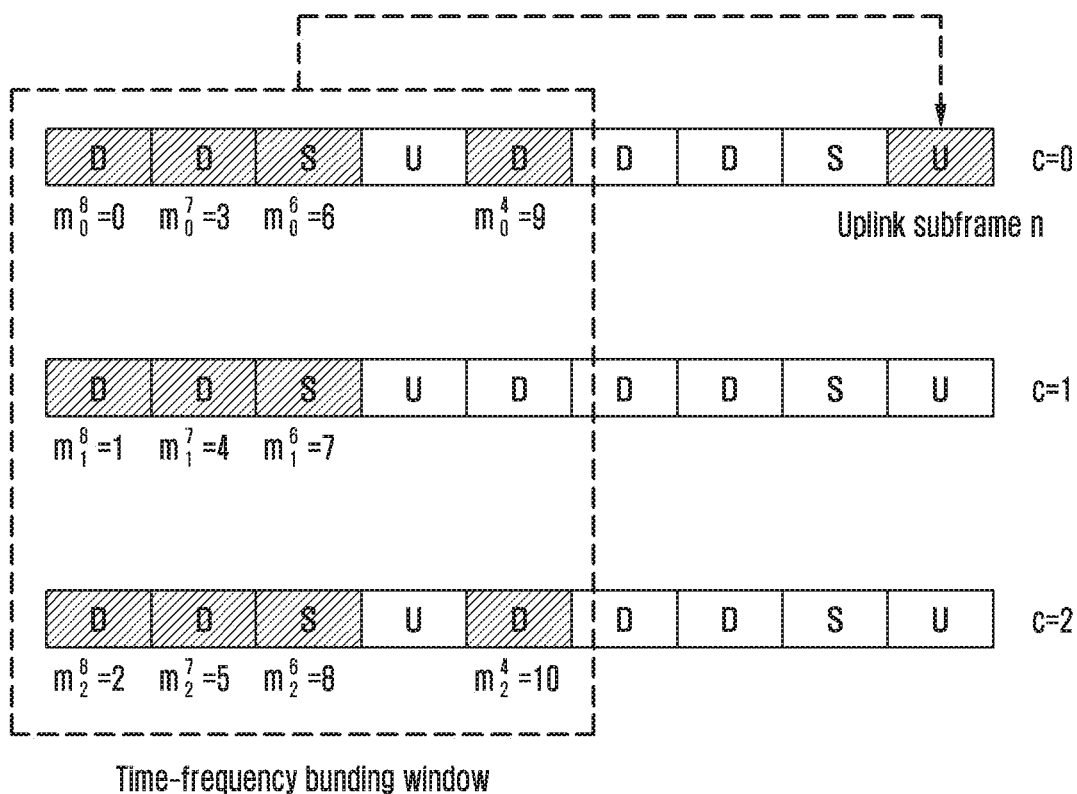
FIG. 3 is a schematic diagram illustrating a time-frequency bundling window according to an embodiment of the present disclosure.

FIG. 3 is a schematic diagram illustrating a time-frequency bundling window according to an embodiment of the present disclosure.

FIG. 3 shows an example of the time-frequency bundling window obtained based on the above manner. In this example, Nc=3, and K=$\{4, 6, 7, 8\}$.

Alternatively, the index $m_{k_c}$ of the downlink subframe in the time-frequency bundling window may be determined according to a following Equation (3):

Let $k_{max}$, denotes a maximum value in set K,
wherein set K is a union of sets K0, K1 ... $K_{Nc}$;

$$\text{let } m_{k_c}=0$$

$$\text{let } i=k_{max}$$

$$\text{let } j=0$$

$$\text{while } j<Nc$$

$$\text{while } i \geq k_c \qquad \text{Equation (3)}$$

if subframe with index n-i on carrier j is a downlink subframe, and the HARQ-ACK bit of this subframe is fed back in uplink subframe n $$m_{k_c}=m_{k_c}+1$$

else $$m_{k_c}=m_{k_c}$$

end if
i=i−1;
end while
j=j+1;
end while

At operation 220, the LTE determines a HARQ feedback unit.

The HARQ feedback unit refers to an entity corresponding to each HARQ-ACK bit fed back by the DE. In an embodiment of the present disclosure, the HARQ feedback unit may be a transmission block (TB) or downlink subframe. In particular, if the HARQ feedback unit is TBs, the HARQ-ACK bit of each TB corresponds to one bit in the feedback bit sequence. For a downlink subframe having downlink HARQ transmission on a carrier with the transmission mode of one TB, the bit corresponds to one bit in the feedback bit sequence. For a subframe having downlink HARQ transmission on the carrier with transmission mode of two TBs, the hit corresponds to two bits in the above feedback bit sequence.

If the HARQ feedback unit is downlink subframes, one HARQ-ACK bit is generated for each downlink frame having downlink HARQ transmission and mapped to the feedback bit sequence (hereinafter referred to as a HARQ-ACK hit of the subframe). If the transmission mode of the downlink subframe is one TB, the bit is a HARQ-ACK hit corresponding to the TB transmitted in the subframe. If the transmission mode of the downlink subframe is two TBs, the bit corresponds to a spatial bundling result of two HARQ-ACK bits corresponding to the two TBs transmitted in the subframe.

The UE determines the type of the HARQ feedback unit through receiving signaling from the eNB. The signaling includes at least one of a broadcast message, radio resource control (RRC) signaling, media access control (MAC) signaling, or physical layer signaling.

At operation 230, the LTE receives downlink grant (DL-GRANT) scheduling downlink HARQ transmission in a downlink subframe of the time-frequency bundling window, and receives downlink HARQ transmission according to scheduling information.

If the UE detects the DL-GRANT in a certain downlink subframe within the time-frequency bundling window, the UE obtains the downlink (DL) DL assignment index (DL DAI) in the DL-GRANT, wherein the DL DAI field includes d bits. The value of d may be defined by standard and may be zero. In an embodiment of the present disclosure, the DL DAI in the DL-GRANT scheduling downlink HARQ transmission may have two types, a time-domain DL DAI, and a combined DAI. The type of the DL DAI is determined by standard. For example, the DL DAI in all DL-GRANTs scheduling the downlink HARQ transmission transmitted on the primary carrier is type 1, and the others are type 2. In an embodiment of the present disclosure, the DL DAI in the DL-GRANT scheduling the downlink HARQ transmission transmitted in the common physical downlink control channel (PDCCH) search space is type 1, and the others are type 2. In an embodiment of the present disclosure, the DL DAI in all DL-GRANTs scheduling the downlink HARQ transmission is type 2. For the DL DAI in the downlink subframe $m_{k_c}$ within the bundling window, it is mapped to a certain integer according to a predefined mapping rule to obtain a mapping value $DAI_{k_c}$ of the DL DAI. The value of $DAI_{k_c}$ is unique among all DL DAIs of the same type within the time-frequency bundling window. The predefined rule is defined by standard.

For the DAI of type 1, $DAI_{k_c}$ denotes how many subframes, from the first downlink subframe in the time-frequency bundling window to the downlink subframe where the DL-GRANT is located, are scheduled by the DL-GRANT containing the DL DAI of type 1, i.e., $DAI_{k_c}$ denotes the number of downlink subframes being scheduled by the DL-GRANT containing the DL DAI of type 1, from the first downlink subframe of the time-frequency bundling window to the downlink subframe where the DL-GRANT is located.

For the DAI of type 2, if the feedback unit is TBs, $DAI_{k_c}$ denotes how many TBs, from the first downlink subframe in the time-frequency bundling window to the downlink subframe where the DL-GRANT is located, are scheduled by the DL-GRANT containing the DL DAI of type 2, i.e., $DAI_{k_c}$ denotes the number of TBs being scheduled by the DL-GRANT containing the DL DAI of type 2, from the first downlink subframe of the time-frequency bundling window to the downlink subframe where the DL-GRANT is located. If the feedback unit is downlink subframes, $DAI_{k_c}$ denotes how many downlink subframes, from the first downlink subframe in the time-frequency bundling window to the downlink subframe where the DL-GRANT is located, are scheduled by the DL-GRANT containing the DL DAI of type 2, i.e., $DAI_{k_c}$ denotes the number of downlink subframes being scheduled by the DL-GRANT containing the DL DAI of type 2, from the first downlink subframe of the time-frequency bundling window to the downlink subframe where the DL-GRANT is located. After the number of feedback units being scheduled is determined according to $DAI_{k_c}$, corresponding downlink receiving may be performed and the corresponding HARQ-ACK information, i.e. ACK or negative ACK (NACK) may be determined.

At operation 240, the TIE determines a total length $O_{ACK}$ of a feedback bit sequence to be fed back in an uplink subframe n.

The value of $O_{ACK}$ is not larger than the total number of feedback units contained in the time-frequency bundling window. The value $O_{ACK}$ may be dynamically indicated by physical layer signaling, e.g., indicated via UL DAI. In an embodiment of the present disclosure, the value $O_{ACK}$ may be indicated by adding an additional bit to the DL-GRANT or using a redundant bit in the DL-GRANT. In particular, in the DL-GRANT transmitted in each subframe, the total number of feedback units scheduled on all carriers adopting the DL-GRANT containing the same type of DL DAI in the subframe is indicated by the bit. In an example where the value of the bit in the last (with respect to time) DL-GRANT containing the DL DAI of the corresponding type received by the TIE in the time-frequency bundling window is T, the subframe where the DL-GRANT is located is N. The UE determines that the value of $O_{ACK}$ is $T \pm DAI_{N0} - 1$. $DAI_{N0}$ denotes the DL DAI value corresponding to the first feedback unit being scheduled in subframe N. In an embodiment of the present disclosure, $DAI_{N0}$ is indicated semi-statically or statically by the eNB via higher layer signaling, or determined by the UE according to the HARQ feedback unit actually received within the time-frequency bundling window. In particular, the UE determines the format of the feedback channel (i.e., the physical uplink control channel (PUCCH) or the physical uplink shared channel (PUSCH) according to the number of HARQ feedback units actually received within the time-frequency bundling window and other information that needs to be fed back (including periodic channel state information (CSI) and scheduling request (SR), etc). The $O_{ACK}$ may be determined by subtracting the number of bits of other information to be fed back from the capacity of the channel capacity.

At operation 250, the UE determines the feedback bit sequence and reports the sequence to the base station.

In an example where the feedback hit sequence is $o_0$ $o_1, \ldots, o_{O_{ACK}-1}$, if the feedback unit is TBs, and the downlink HARQ transmission mode in downlink subframe $m_{k_c}$ is one TB, the HARQ-ACK bit of this TB corresponds to $$o_{DAI_{k_c}+\Delta}.$$

If the transmission mode of the downlink HARQ transmission in subframe $m_{k_c}$ two TBs, the HARQ-ACK bit of the first TB corresponds to $$o_{DAI_{k_c}-1+\Delta},$$

and the HARQ-ACK bit of the second TB corresponds to $$o_{DAI_{k_c}+\Delta}.$$

If the feedback unit is subframes, the HARQ-ACK bit of downlink subframe $m_{k_c}$ which has downlink HARQ transmission within the time-frequency bundling window corresponds to $$o_{DAI_{k_c}+\Delta}.$$

In an example where the feedback bit sequence is $o_0$ $o_1, \ldots, o_{O_{ACK}-1}$, then, for the downlink HARQ transmission scheduled by the DL-GRANT containing DL DAI of type 2, if the feedback unit is TBs and the downlink HARQ transmission mode in downlink subframe $m_{k_c}$ is one TB, the HARQ-ACK bit of this TB corresponds to $$o_{DAI_{k_c}+\Delta}.$$

If the transmission mode of the downlink HARQ transmission in subframe $m_{k_c}$ is two TBs, the HARQ-ACK bit of the first TB corresponds to $$o_{DAI_{k_c}-1+\Delta},$$

and the HARQ-ACK bit of the second TB corresponds to $$o_{DAI_{k_c}+\Delta}.$$

If the feedback unit is subframes, the HARQ-ACK bit of downlink subframe $m_{k_c}$ which has downlink HARQ transmission within the time-frequency bundling window corresponds to $$o_{DAI_{k_c}+\Delta}.$$

For the downlink HARQ transmission scheduled by the DL-GRANT containing DL DAI of type 1, the HARQ-ACK bit (if the HARQ feedback unit is TBs) of the TB in the downlink subframe whose HARQ-ACK is fed back in the uplink subframe n on the carrier or the HARQ-ACK bit (if the HARQ feedback unit is downlink subframes) of the downlink subframe may be mapped to a predefined position of the feedback bit sequence. In an embodiment, the HARQ-ACK bit may be mapped to a start point of the feedback bit sequence, mapped to a position behind the HARQ-ACK bit corresponding to semi-persistent scheduling (SPS) transmission, mapped to the end of the HARQ-ACK bit sequence corresponding to the HARQ feedback unit in the time-frequency bundling window, or mapped to a position in front of the HARQ-ACK bit corresponding to the SPS transmission.

If there is SPS downlink transmission in the time-frequency bundling window, the HARQ-ACK bit corresponding to the SPS downlink transmission is mapped to a predefined position of the feedback bit sequence. In one embodiment, according to the index of the downlink subframe where the SPS transmission is located in the time-frequency bundling window, the HARQ-ACK bit corresponding to the SPS transmission may be mapped to the beginning of the feedback bit sequence according to an ascending order of the indexes, or mapped to a position in front of the HARQ-ACK bit corresponding to the downlink HARQ transmission scheduled by the DL-GRANT containing DL DAI of type 1. In an embodiment of the present disclosure, according to the index of the downlink subframe where the SPS transmission is located in the time-frequency bundling window, the HARQ-ACK bit corresponding to the SPS transmission may be mapped to the end of the feedback bit sequence according to a descending order of the indexes, or mapped to a position in front of the HARQ-ACK bit corresponding to the downlink HARQ transmission scheduled by the DL-GRANT containing DL DAI of type 1.

If there is a HARQ-ACK bit corresponding to other types of HARQ transmission in front of the HARQ-ACK bit corresponding to the downlink HARQ transmission scheduled by the DL-GRANT containing the DL DAI of type 2, e.g., there is a HARQ-ACK bit corresponding to the downlink HARQ transmission scheduled by the DL-GRANT containing DL DAI of type 1 or the HARQ-ACK bit corresponding to SPS downlink transmission, the value of $\Delta$ equals the total number of HARQ-ACK bits corresponding to the other type downlink HARQ transmission; otherwise, the value of $\Delta$ is 0.

In the feedback bit sequence, if a bit does not correspond to any HARQ feedback unit, the value of the bit is configured as NACK, i.e., configured as 0. Embodiments of the present disclosure do not restrict the time sequence that the UE executes the above operations. Any modifications or adjustments to the execution sequence of one or more of the above operations may be provided in one or more embodiments of the present disclosure.

In order to facilitate understanding by way of example, technical solutions of the present disclosure may be described with reference to interactions of devices in detailed application scenarios.

Embodiment 1

In this embodiment of the present disclosure, all downlink CCs of the UE are FDD downlink carriers, i.e., the UE feeds back HARQ-ACK of downlink CCs according to FDD downlink HARQ timing relationship. According to signaling indications of the eNB, the feedback unit during the HARQ-ACK feedback procedure of the UE is TBs. In addition, the number of bits in the DL DAI field is 3. The UE determines the total number of feedback units through receiving physical layer signaling from the eNB before determining the feedback bit sequence. There is no SPS transmission in the time-frequency bundling window. The detailed operations based thereon are as follows.

At operation 1, the UE determines the time-frequency bundling window corresponding to an uplink subframe n.

In this embodiment, K={4}. The time-frequency bundling window denotes a set that consists of downlink subframes with index n−4 on all downlink CCs whose HARQ-ACK is fed back in an uplink subframe n. The index $m_{k_c}$ the downlink subframe in the time-frequency bundling window denotes the index of the carrier where the corresponding downlink subframe is located. Herein, the index of the carrier refers to an index of the carrier after the indexes of all downlink CCs whose HARQ-ACK is fed back in an uplink subframe n are sorted according to an ascending order or a descending order. The index of the carrier starts from 0.

Figure 4:
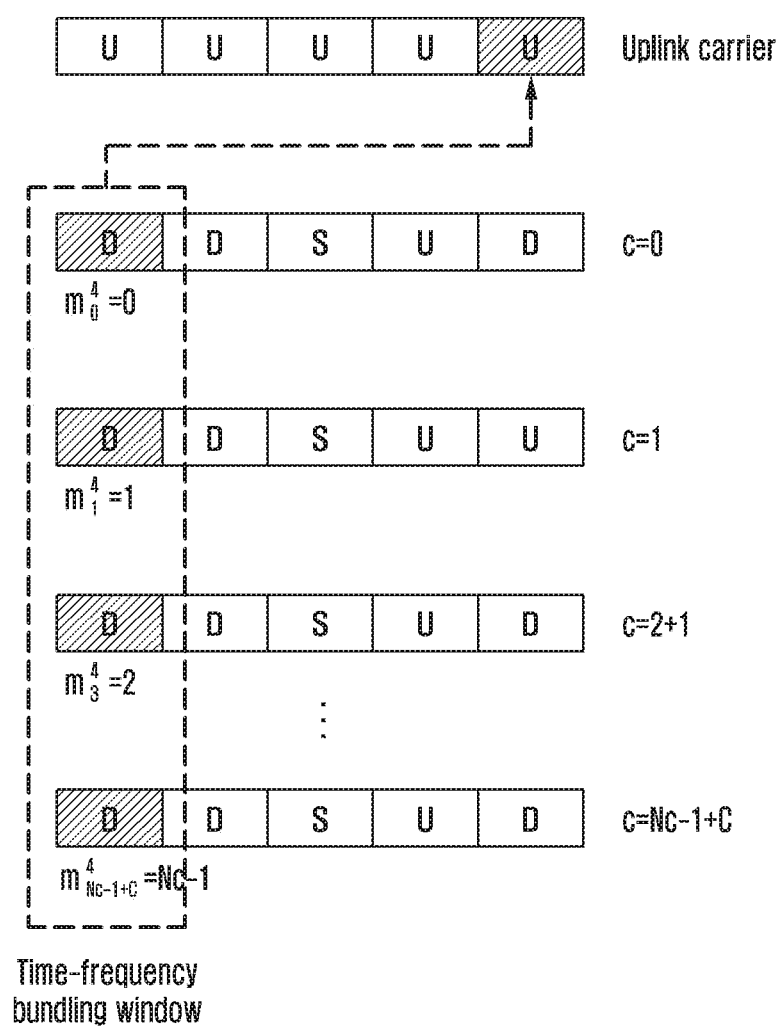
FIG. 4 is a schematic diagram illustrating a time-frequency bundling window in a case where downlink component carriers (CCs) of the user equipment (UE) are all frequency division duplex (FDD) carriers according to an embodiment of the present disclosure.

FIG. 4 is a schematic diagram illustrating a time-frequency bundling window in a case where downlink CCs of the UE are all FDD carriers according to an embodiment of the present disclosure.

Referring to FIG. 4, since the range of the index of the carrier may be larger than the number of the CCs of the UE, the carrier index configured by the UE may be inconsistent with the order of the carrier. Therefore, the index of the (Nc−1)$^{th}$ carrier is denoted by Nc−1+C in the drawings.

At operation 2, the UE receives the DL-GRANT scheduling the downlink HARQ transmission in a downlink subframe of the time-frequency bundling window, and receives the downlink HARQ transmission according to scheduling information.

If the UE detects the DL-GRANT in a certain downlink subframe in the time-frequency bundling window, the UE obtains the status of the DL DAI field in the DL-GRANT. In this embodiment, the DL DAI field includes 3 bits. Without loss generality, the mapping relationship between the status of the DL DAI field and the $DAI_{k_c}$ in this embodiment is as shown in Table 4. In this embodiment, $DAI_{k_c}$ denotes how many TBs are scheduled from the first downlink subframe of the time-frequency bundling window to the downlink subframe where the DL-GRANT is located.

TABLE 4

Mapping relationship from DL DAI field to $DAI_{k_c}$

| DL DAI MSB, LSB | $DAI_{k_c}$ |
|---|---|
| 0, 0, 0 | 1 or 9 or 17 or . . . |
| 0, 0, 1 | 2 or 10 or 18 or . . . |
| 0, 1, 0 | 3 or 11 or 19 or . . . |
| 0, 1, 1 | 4 or 12 or 20 or . . . |
| 1, 0, 0 | 5 or 13 or 21 or . . . |
| 1, 0, 1 | 6 or 14 or 22 or . . . |
| 1, 1, 0 | 7 or 15 or 23 or . . . |
| 1, 1, 1 | 0 or 8 or 16 or . . . |

At operation 3, the UE determines the total length $O_{ACK}$ of the feedback bit sequence to be fed back in an uplink subframe n.

Before sending an uplink subframe n, the UE receives physical layer signaling from the eNB and determines the value of the $O_{ACK}$.

At operation 4, the UE determines the feedback bit sequence and reports the feedback bit sequence to the base station.

In an example where the feedback bit sequence is $o_0 o_1, \ldots, o_{O_{ACK}-1}$, if the transmission mode of the downlink HARQ transmission transmitted in downlink subframe $m_{k_c}$ in time-frequency bundling window is one TB, the HARQ-ACK bit of the TB corresponds to $$o_{DAI_{k_c}}.$$

If the transmission mode of the downlink HARQ transmission transmitted in downlink subframe $m_{k_c}$ the time-frequency bundling window is two TBs, the HARQ-ACK bit of the first TB corresponds to $$o_{DAI_{k_c}} - 1,$$

and the HARQ-ACK bit of the second TB corresponds to $$o_{DAI_{k_c}}.$$

In the feedback bit sequence, if a bit does not correspond to any feedback unit, the value of the bit is configured to be NACK, i.e., 0.

Embodiment 2

In this embodiment, all downlink CCs of the UE are TDD carriers. The UE feeds back HARQ-ACK of all downlink CCs according to the HARQ timing relationship of TDD uplink-downlink configuration 2 of Table 2. According to the signaling indication of the eNB, the UE determines that the feedback unit during the HARQ-ACK feedback procedure is TB. In addition, the number of bits of the DL DAI field is 3. The UE determines the total number of feedback units through receiving the physical layer signaling of the eNB before determining the feedback bit sequence. There is no SPS scheduling in the time-frequency bundling window. The detailed operations based thereon are as follows.

At operation 1, the UE determines a time-frequency bundling window of an uplink subframe n.

In this embodiment, K={8, 7, 6, 4}. The time-frequency bundling window is a set that consists of downlink subframes with indexes n−4 on all downlink CCs whose HARQ-ACK is fed back in uplink subframe n, wherein k∈K. The index $m_{k_c}$ of the downlink subframe in the time-frequency window is determined according to the manner in operation 210 of FIG. 2.

At operation 2, the UE receives DL-GRANT scheduling downlink HARQ transmission in a downlink subframe in the time-frequency bundling window, and receives the downlink HARQ transmission according to scheduling information.

If the UE detects the DL-GRANT in a certain downlink subframe in the time-frequency bundling window, the UE obtains the status of the DL DAI field in the DL-GRANT. In this embodiment, the DL DAI field includes 3 bits. Without loss generality, the mapping relationship between the status of the DL DAI field and the $DAI_{k_c}$ in this embodiment is as shown in Table 4. In this embodiment, $DAI_{k_c}$ denotes how many TBs are scheduled from the first downlink subframe of the time-frequency bundling window to the downlink subframe where the DL-GRANT is located.

At operation 3, the UE determines the total length $O_{ACK}$ of the feedback bit sequence to be fed back in an uplink subframe n.

Before sending an uplink subframe n, the UE receives physical layer signaling from the eNB and determines the value of the $O_{ACK}$.

At operation 4, the UE determines the feedback bit sequence and reports the feedback bit sequence to the base station.

In an example where the feedback bit sequence is $o_0 o_1, \ldots, o_{O_{ACK}-1}$, if the transmission mode of the downlink HARQ transmission transmitted in downlink subframe $m_{k_c}$ time-frequency bundling window is one TB, the HARQ-ACK bit of the TB corresponds to $$o_{DAI_{k_c}}.$$

If the transmission mode of the downlink HARQ transmission transmitted in downlink subframe $m_{k_c}$ in the time-frequency bundling window is two TBs, the HARQ-ACK bit of the first TB corresponds to $$O_{DAI_{k_c}} - 1,$$

and the HARQ-ACK bit of the second TB corresponds to $$O_{DAI_{k_c}}.$$

In the feedback bit sequence, if a bit does not correspond to any feedback unit, the value of the bit is configured to be NACK, i.e., 0.

Embodiment 3

In this embodiment, the downlink CCs of the UE include both FDD downlink carriers and TDD carriers. The carrier where the uplink subframe in which the HARQ-ACK is fed back is located is an FDD carrier. The UE feeds back the HARQ-ACK of the downlink CC according to the FDD timing relationship. According to the signaling indication of the eNB, the UE determines that the feedback unit during the HARQ-ACK feedback procedure is downlink subframes. In addition, the number of bits of the DL DAI field is 3. The UE determines the total number $O_{ACK}$ of feedback units according to the RRC signaling of the eNB, i.e., $O_{ACK}$ is a semi-statically configured value, and $O_{ACK}$ is not larger than the number of downlink subframes in the time-frequency bundling window. There is no SPS scheduling in the time-frequency bundling window. The detailed operations based thereon are as follows.

At operation 1, the UL determines the time-frequency bundling window of an uplink subframe n.

In this embodiment, K={4}. The time-frequency bundling window is a set of downlink subframes with indexes n–4 on all downlink CCs whose HARQ-ACK is fed back in an uplink subframe n. The index $m_{k_c}$ the downlink subframe in the time-frequency window is determined according to the manner in operation 210 of FIG. 2.

At operation 2, the UE receives DL-GRANT scheduling downlink HARQ transmission in a downlink subframe in the time-frequency bundling window, and receives the downlink HARQ transmission according to scheduling information.

If the UE detects the DL-GRANT in a certain downlink subframe in the time-frequency bundling window, the UE obtains the status of the DL DAI field in the DL-GRANT. In this embodiment, the DL DAI field includes 3 bits. Without loss generality, the mapping relationship between the status of the DL DAI field and the $DAI_{k_c}$ in this embodiment is as shown in Table 4. In this embodiment, DAI denotes how many downlink subframes are scheduled from the first downlink subframe of the time-frequency bundling window to the downlink subframe where the DL-GRANT is located.

At operation 3, the UE determines the total length $O_{ACK}$ of the feedback bit sequence to be fed back in uplink subframe n.

In an example where the feedback bit sequence is $o_0$ $o_1$, . . . , $o_{O_{ACK}-1}$, the HARQ-ACK bit of the downlink subframe $m_{k_c}$ having downlink HARQ transmission in the time-frequency bundling window corresponds to $$O_{DAI_{k_c}}.$$

In the feedback bit sequence, if a bit does not correspond to any feedback unit, the value of the bit is configured to be NACK, i.e., 0.

Figure 5:
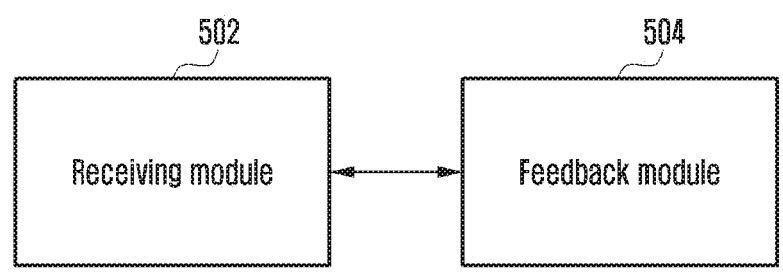
FIG. 5 is a schematic diagram illustrating a structure of a HARQ-ACK information feedback apparatus according to an embodiment of the present disclosure.

FIG. 5 is a schematic diagram illustrating a structure of a HARQ-ACK information feedback apparatus according to an embodiment of the present disclosure.

Referring to FIG. 5, in accordance with the above method, the present disclosure further provides an apparatus. The apparatus includes a receiving module 502 and a feedback module 504, wherein the receiving module 502 is adapted to receive DL-GRANT scheduling downlink HARQ transmission in a time-frequency bundling window corresponding to an uplink subframe in which HARQ-ACK is fed back, obtain DL DAI in the DL-GRANT, and determine a mapping value of each DL DAI. The feedback module 504 is adapted to map a HARQ-ACK bit of each HARQ feedback unit to a corresponding bit of a feedback bit sequence according to the mapping value of the DL DAI.

Those skilled in the art will recognize that all or some operations of the various embodiments of the present disclosure may be implemented by one or more programs running on relevant hardware. The program may be stored in a computer readable storage medium. When the program is executed, one or more operations and/or features of the various embodiments of the method may be implemented.

In addition, the functional units of each embodiment of the present disclosure may be integrated into one or more processing modules, or may be independently configured. In an embodiment of the present disclosure, two or more units may be integrated into one module. The above integrated module may be implemented by hardware or by software functional modules. In a case where the integrated module is implemented in the form of software functional modules and is sold or used as an independent product, it may be stored in a computer readable storage medium.

The above-mentioned storage medium may be read-only memory, disk or compact disc, etc.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method for feeding back hybrid automatic repeat request-acknowledgement (HARQ-ACK) information by a user equipment (UE), the method comprising:
   receiving, from a base station, downlink control information (DCI) including a downlink assignment indicator (DAI) on a physical downlink control channel (PDCCH) or enhanced PDCCH (ePDCCH);
   receiving, from the base station, data on a physical downlink shared channel (PDSCH);
   generating the HARQ-ACK information for the data based on the DAI and a bundling window, wherein the bundling window associated with the DAI includes downlink subframes corresponding to a same uplink subframe, and the downlink subframes corresponding to the same uplink subframe are indexed first in order of a frequency index and then in order of a time index; and transmitting, to the base station, the HARQ-ACK information in the same uplink subframe on a physical uplink control channel (PUCCH),
wherein the downlink subframes in the bundling window are indexed in increasing order of first frequency indexes at a first time index associated with the DAI and then the downlink subframes in the bundling window are indexed in increasing order of second frequency indexes at a second time index associated with the DAI, and
wherein the first time index and the second time index are determined in increasing order of a subframe index.

2. The method of claim 1, the method further comprising:
identifying the DAI; and
mapping a HARQ-ACK bit of a HARQ feedback unit to a bit of a feedback bit sequence according to the identified DAI.

3. The method of claim 2, wherein the HARQ feedback unit is a downlink subframe.

4. A method for receiving hybrid automatic repeat request-acknowledgement (HARQ-ACK) information by a base station, the method comprising:
transmitting, to a user equipment (UE), downlink control information (DCI) including a downlink assignment indicator (DAI) on a physical downlink control channel (PDCCH) or enhanced PDCCH (ePDCCH);
transmitting, to the UE, data on a physical downlink shared channel (PDSCH); and
receiving, from the UE, the HARQ-ACK information for the data in a same uplink subframe on a physical uplink control channel (PUCCH),
wherein the HARQ-ACK information is generated by the UE based on the DAI and a bundling window, wherein the bundling window associated with the DAI includes downlink subframes corresponding to the same uplink subframe, and the downlink subframes corresponding to the same uplink subframe are indexed first in order of a frequency index and then in order of a time index,
wherein the downlink subframes in the bundling window are indexed in increasing order of first frequency indexes at a first time index associated with the DAI and then the downlink subframes in the bundling window are indexed in increasing order of second frequency indexes at a second time index associated with the DAI, and
wherein the first time index and the second time index are determined in increasing order of a subframe index.

5. A user equipment (UE) for feeding back hybrid automatic repeat request-acknowledgement (HARQ-ACK) information, the UE comprising:
a transceiver; and
at least one processor configured to:
control the transceiver to receive, from a base station, downlink control information (DCI) including a downlink assignment indicator (DAI) on a physical downlink control channel (PDCCH) or enhanced PDCCH (ePDCCH),
control the transceiver to receive, from the base station, data on a physical downlink shared channel (PDSCH),
generate the HARQ-ACK information for the data based on the DAI and a bundling window, wherein the bundling window associated with the DAI includes downlink subframes corresponding to a same uplink subframe, and the downlink subframes corresponding to the same uplink subframe are indexed first in order of a frequency index and then in order of a time index, and
control the transceiver to transmit, to the base station, the HARQ-ACK information in the same uplink subframe on a physical uplink control channel (PUCCH),
wherein the downlink subframes in the bundling window are indexed in increasing order of first frequency indexes at a first time index associated with the DAI and then the downlink subframes in the bundling window are indexed according to in increasing order of second frequency indexes at a second time index associated with the DAI, and
wherein the first time index and the second time index are determined in increasing order of a subframe index.

6. The UE of claim 5, the at least one processor is further configured to:
identify the DAI; and
map a HARQ-ACK bit of a HARQ feedback unit to a bit of a feedback bit sequence according to the identified DAI.

7. The UE of claim 6, wherein the HARQ feedback unit is a downlink subframe.

8. A base station for receiving hybrid automatic repeat request-acknowledgement (HARQ-ACK) information, the base station comprising:
a transceiver; and
at least one processor configured to:
control the transceiver to transmit, to a user equipment (UE), downlink control information (DCI) including a downlink assignment indicator (DAI) on a physical downlink control channel (PDCCH) or enhanced PDCCH (ePDCCH),
control the transceiver to transmit, to the UE, data on a physical downlink shared channel (PDSCH), and
control the transceiver to receive, from the UE, the HARQ-ACK information for the data in a same uplink subframe on a physical uplink control channel (PUCCH),
wherein the HARQ-ACK information is generated by the UE based on the DAI and a bundling window, wherein the bundling window associated with the DAI includes downlink subframes corresponding to the same uplink subframe, and the downlink subframes corresponding to the same uplink subframe are indexed first in order of a frequency index and then in order of a time index,
wherein the downlink subframes in the bundling window are indexed in increasing order of first frequency indexes at a first time index associated with the DAI and then the downlink subframes in the bundling window are indexed in increasing order of second frequency indexes at a second time index associated with the DAI, and
wherein the first time index and the second time index are determined in increasing order of a subframe index.

* * * * *